Inventor
MICHAEL J. GINGELL
By Alfred C. Hill
Agent

Inventor
MICHAEL J. GINGELL
By Alfred C. Hill
Agent

Inventor
MICHAEL J. GINGELL
By Alfred C. Hill
Agent

Inventor
MICHAEL J. GINGELL
By Alfred C. Hill
Agent

Inventor
MICHAEL J. GINGELL
By Alfred C. Hill
Agent

Inventor
MICHAEL J. GINGELL
By Alfred C. Hill
Agent

United States Patent Office
3,559,042
Patented Jan. 26, 1971

3,559,042

POLYPHASE SYMMETRICAL NETWORK

Michael John Gingell, Sawbridgeworth, England, assignor to International Standard Electric Corporation, New York, N.Y., a corporation of Delaware Filed May 19, 1969, Ser. No. 825,871
Claims priority, application Great Britain, June 7, 1968, 27,162/68
Int. Cl. G05f 3/04
U.S. Cl. 323—122 14 Claims

ABSTRACT OF THE DISCLOSURE

Symmetrical polyphase networks are disclosed comprising at least one polyphase network section including N single phase circuits, each of the circuits having a first impedance coupled between the input and output terminals of an associated one of the circuits. The input terminal of each one of the N circuits is also coupled to the output terminal of one of the circuits responding to an adjacent phase (leading or lagging) of the input signal by a second impedance having a different phase angle characteristic than that of the first impedance. When two or more networks are provided they are connected in cascade.

BACKGROUND OF THE INVENTION

The invention relates to polyphase networks and more particularly to symmetrical polyphase networks.

SUMMARY OF THE INVENTION

A feature of this invention is the provision of a symmetrical polyphase network comprising at least one polyphase network including N single phase circuits, where N is an integer greater than one; each of the circuits having an input terminal, an output terminal, a first impedance having a given phase angle characteristic coupled between the input and output terminals of an associated one of the circuits, and a second impedance having a phase angle characteristic different than the given phase angle characteristic coupled between the input terminal of the associated one of the circuits and the output terminal of another of the circuits responding to the phase of an input signal adjacent the phase of the input signal to which the associated one of the circuits responds.

BRIEF DESCRIPTION OF THE DRAWING

The above-mentioned and other features and objects of this invention will become more apparent by reference to the following description taken in conjunction with the accompanying drawings, in which:

FIGS. 11(A) to (C) show vector diagrams; and

DESCRIPTION OF THE PREFERRED EMBODIMENTS

Figure 1:
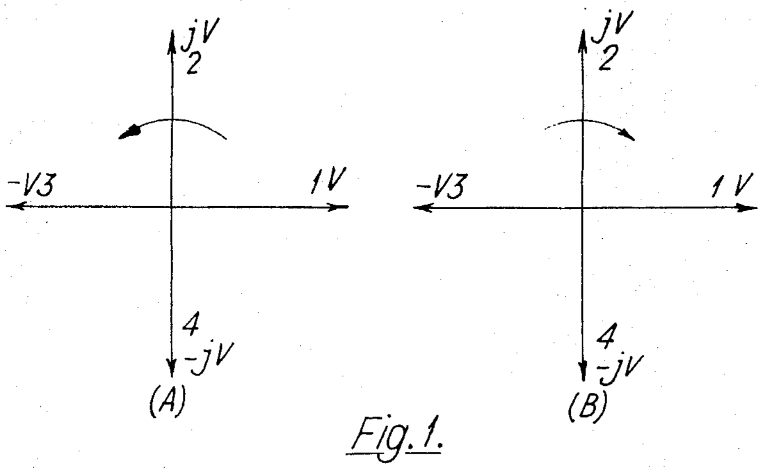
FIGS. 1(A) and 1(B), respectively, illustrate positive and negative sequence (positive and negative frequency) four phase vector diagrams.

In order to understand the operation of the symmetrical polyphase networks according to the present invention, the concept of negative frequency must be introduced. If a four-phase system is considered which has, as shown in the drawing according to FIG. 1(A), voltages of V, $-j$V, $-$V, $+j$V applied to its four input terminals then the input signal can be called symmetrical, since all voltages are equal in magnitude and spaced apart by steps of 90°, and, of, say, positive sequence, since, conventionally, all vectors rotate anticlockwise and the voltage on path 1 leads that on path 2 by 90°, and similarly, the voltage on path 2 leads that on path 3, etc. If now the vectors rotate the opposite way, i.e., as shown in FIG. 1(B) the system is still symmetrical, but is now of negative sequence, since the voltage on path 1 lags the voltage on path 2 by 90° instead of leading as before.

Figures 2, 11:
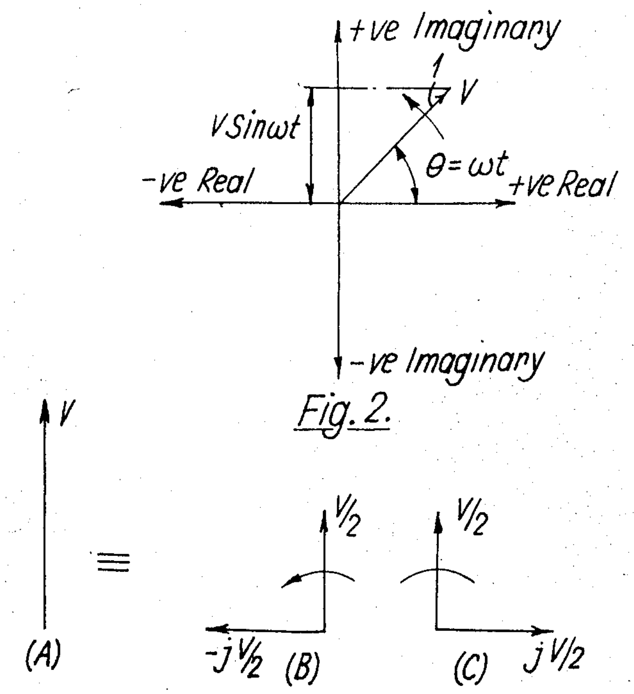
FIG. 2 illustrates a positive sequence four phase vector diagram.

Considering the voltage on path 1, it can be seen from FIG. 2 that this voltage is $V \sin \omega t$, i.e., the projection of vector 1 on to the imaginary axis when it is being rotated anti-clockwise. When the sequence of vectors is reversed, $-V \sin \omega t$ will be observed. Since $$-\sin \omega t=\sin (-\omega t)$$

it can be said that, on one single phase circuit positive sequence represents positive $\omega$ and negative sequence represents negative $\omega$. Thus, where positive and negative frequencies are hereinafter referred to with reference to the characteristics of a single phase network, it means positive and negative sequence, respectively, in a polyphase network containing N single phase networks.

It is well known in the art that it is possible to build passive RC all-pass networks and to construct two such networks with a phase difference at their outputs of approximately 90° with a bandwidth determined by the network complexity.

Figure 3A:
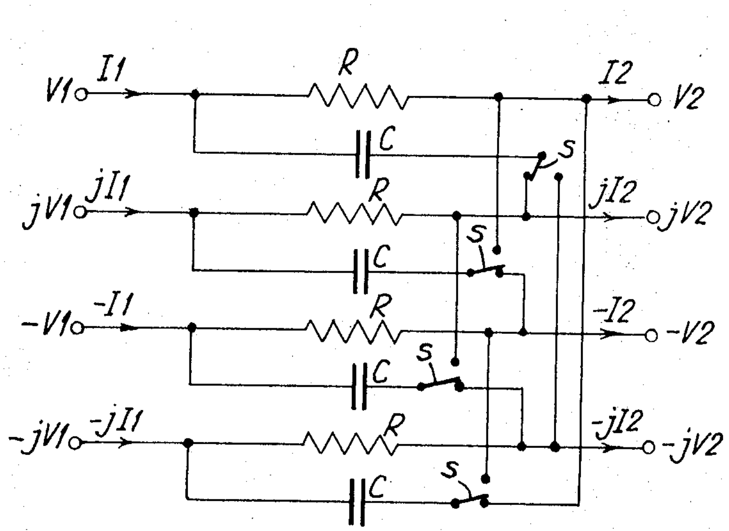
FIGS. 3A and 3B show two circuit diagrams of symmetrical four phase networks according to the present invention.

A symmetrical polyphase network according to the present invention which performs exactly the same function as the two separate RC networks and which is very much less sensitive to component tolerances includes at least one network section of the type shown in FIG. 3A. When a plurality of these network sections are provided, they are connected in cascade.

Referring to FIG. 3A, a four phase network section together with typical voltages and currents associated with each phase is shown therein and includes resistor R in each of the four phases (single phase circuits) which is connected between the input and output terminals of the phase with which it is associated. The input of each single phase circuit is connected to the output of a single phase circuit responding to an adjacent leading phase of the input signal via capacitor C when switches S are in the position illustrated.

The chain matrix for each one of the phases of this four phase network section is:

$$\begin{bmatrix} V_1 \\ I_1 \end{bmatrix} = \begin{bmatrix} \frac{1+j\omega CR}{1-\omega CR} & \frac{R}{1-\omega CR} \\ \frac{2j\omega C}{1-\omega CR} & \frac{1+j\omega CR}{1-\omega CR} \end{bmatrix} \begin{bmatrix} V_2 \\ I_2 \end{bmatrix} \quad (1)$$

From this matrix, it can be seen that a transmission zero occurs at $$\omega = \frac{1}{CR}$$

Figure 4:
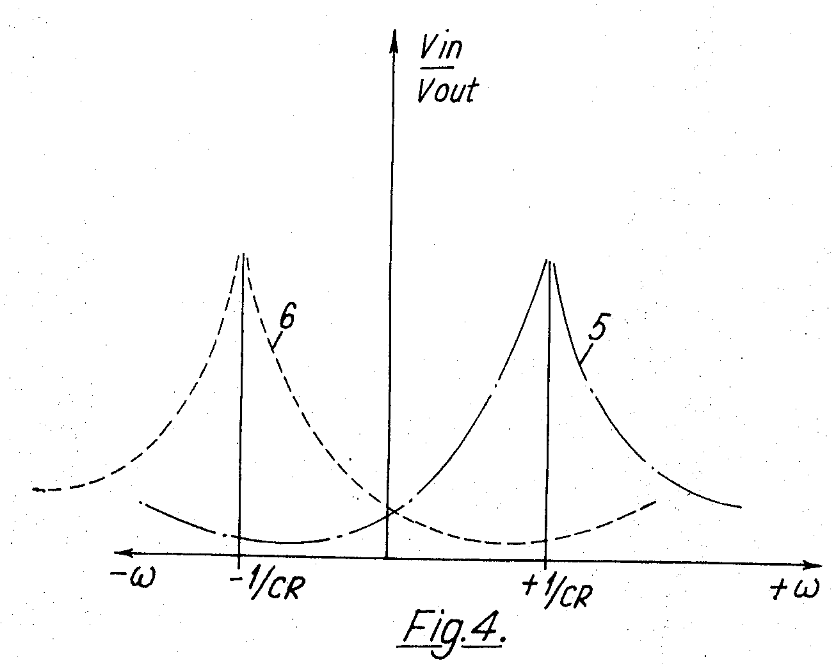
FIG. 4 illustrates attenuation characteristics for the network shown in FIG. 3.

The insertion loss for a single phase takes the form shown by the chain dotted line 5 in FIG. 4.

It should be noted that the input of each phase of the network according to FIG. 3A may be connected via a capacitor to the output of a single phase circuit responding to an adjacent lagging phase the input signal instead of a single phase circuit responding to an adjacent leading phase of the input signal when switches S are moved to their other position. In this case the chain matrix of Equation 1 would become :

$$\begin{bmatrix} V_1 \\ I_1 \end{bmatrix} = \begin{bmatrix} \frac{1+j\omega CR}{1+\omega CR} & \frac{R}{1+\omega CR} \\ \frac{2j\omega C}{1+\omega CR} & \frac{1+j\omega CR}{1+\omega CR} \end{bmatrix} \begin{bmatrix} V_2 \\ I_2 \end{bmatrix} \quad (2)$$

It can, therefore, be seen from this equation that a transmission zero will occur at $$\omega = \frac{1}{CR}$$

and the insertion loss for a single phase circuit will take the form shown by the dotted line 6 in FIG. 4.

Figure 3B:
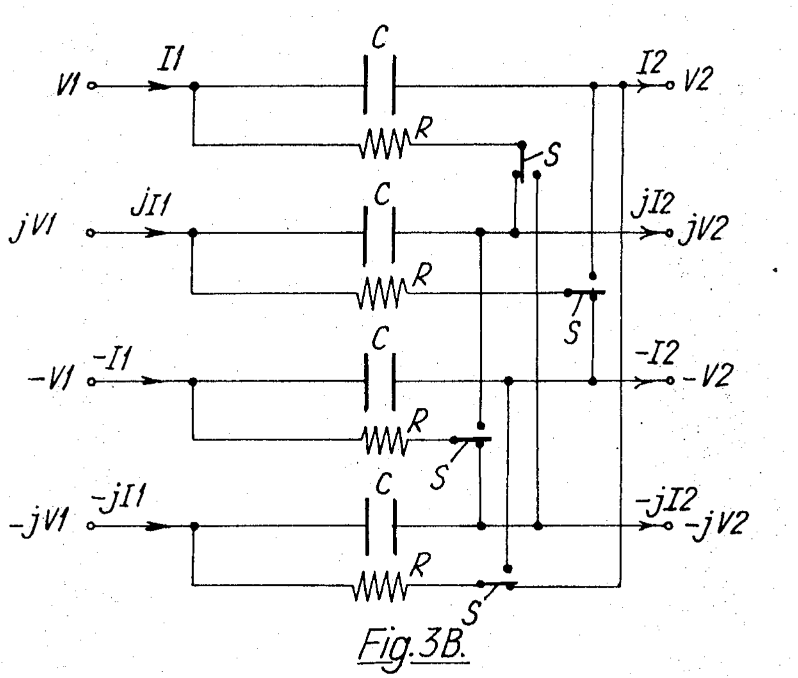

In each of the symmetrical polyphase network sections outlined in the preceding paragraphs, capacitor C and resistor R may be interchanged as illustrated in FIG. 3B. This interchange results in a reversal of the attenuation characteristics about zero frequency and introduces a phase shift through the network section of 90°. For example, the chain matrix of Equation 1 for the network section of FIG. 3A becomes:

$$\omega = -1/CR$$

$$\begin{bmatrix} V_1 \\ I_1 \end{bmatrix} = \begin{bmatrix} \frac{1+j\omega CR}{j(1+\omega CR)} & \frac{R}{j(1+\omega CR)} \\ \frac{2j\omega C}{j(1+\omega CR)} & \frac{1+j\omega CR}{j(1+\omega CR)} \end{bmatrix} \begin{bmatrix} V_2 \\ I_2 \end{bmatrix} \quad (3)$$

when the capacitor and resistor are interchanged.

The characteristic from a single network section may not be very desirable for certain applications where it is necessary to be able to regulate the attenuation characteristics to a desired form. For example, the attenuation characteristic shown in FIG. 5 may be required in which case it would be necessary to provide four of the network sections connected in cascade, the transmission zeros which occur in the lower side band at $$\omega_1 = -1/C_1R_1$$

$$\omega_2 = -1/C_2R_2$$

$$\omega_3 = -1/C_3R_3$$

and $$\omega_4 = -1/C_4R_4$$

are each associated with a separate one of the four phases.

Figure 5:
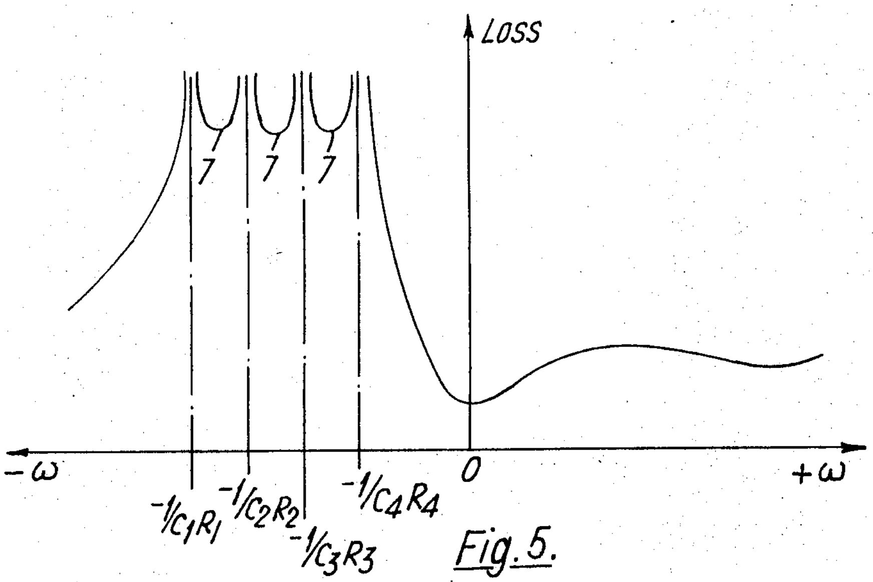
FIG. 5 illustrates attenuation characteristics for a symmetrical polyphase network which includes four networks of the type shown in FIG. 3 connected in cascade.

The combined value of the circuit elements associated with each network section fixes the position of the transmission zero associated with that particular network section and the shape of the pass band section of the attenuation characteristics shown in FIG. 5 may be varied by causing a variation of the value of the circuit elements associated with any one of the network section while maintaining the combined value of these elements. By this means the average attenuation level for the pass band may be varied as desired to suit a particular requirement. There will of course be a corresponding change in the minimum levels, i.e., the levels 7 shown in FIG. 5, for the attenuation characteristic between the transmission zeros, thereby resulting in a variation of the average attenuation level for the stop band section of the attenuation characteristics.

A synthesis procedure which may be used to determine the characteristics of a plurality of cascaded network sections involves multiplying the matrices of these sections together in order to determine the overall transfer function in terms of the elements, i.e., the resistors and capacitors associated with each network section. The transfer function of the cascade network sections plus quadrature modulation is then equated to the transfer function of the equivalent two all-pass networks plus quadrature modulation.

By equating coefficient of powers of $\omega$, the element values of the symmetrical polyphase network can be determined and the desired characteristic obtained.

Utilization of this synthesis procedure enables symmetrical polyphase networks having up to four cascaded network sections to be designed quite easily. Beyond four sections, the algebra begins to become arduous although there is no limit, theoretically, to the network complexity. It has been found advantageous in view of this problem to utilize a computer to determine the values of the elements of the various network sections which give the desired insertion loss characteristics.

Figure 6B:
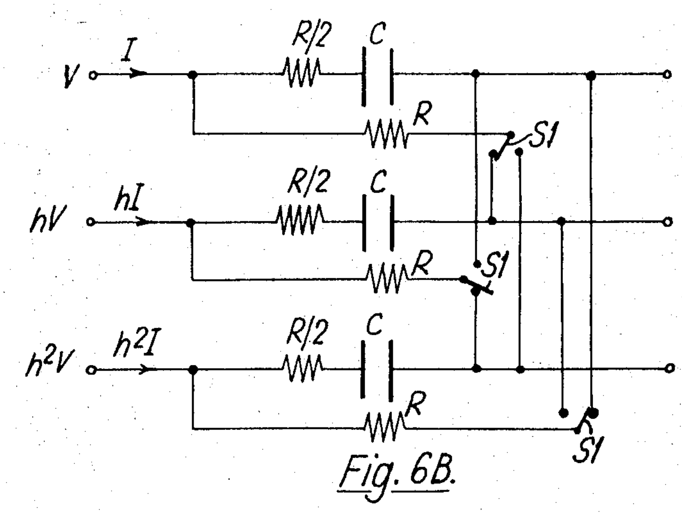
FIGS. 6A and 6B show two circuit diagrams of symmetrical three phase networks according to the present invention.
Figure 6A:
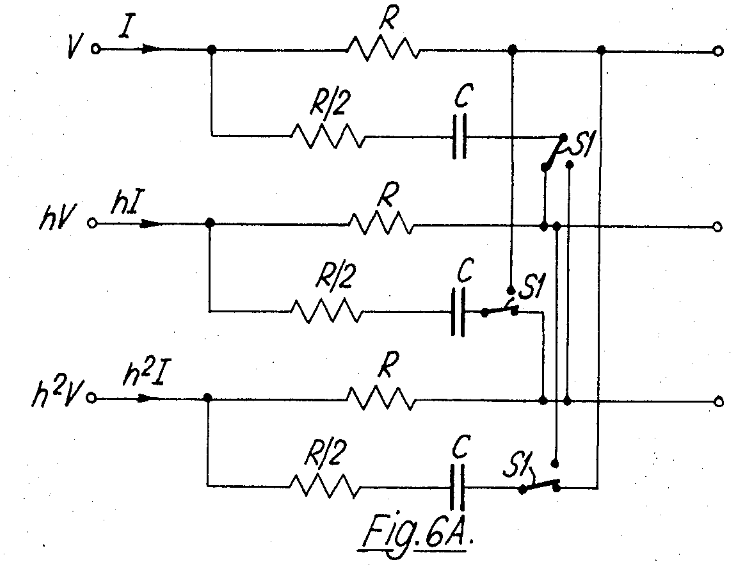

Symmetrical polyphase networks with other than four phases are slightly more complex. The circuit diagram of a three phase network section is shown, by way of example, in FIG. 6A. This three phase network section which may be utilized, for example, to provide three phase 50 Hz for an electric motor is basically the same as the network section according to FIG. 3A, except the voltages associated with each phase are different and resistor R/2 is connected in series with capacitor C between the input of each phase and the output of one of the single phase circuits responding to an adjacent leading phase of the input signal when switches S1 are in the position illustrated. It should be noted that the modifications outlined in preceding paragraphs for the circuit diagram of FIGS. 3A and 3B also apply to this circuit arrangement. Note the interchanges of elements in FIG. 6B and that the movement of switches S1 to their other position connects the input of each phase to the output of one of the single phase circuits responding to an adjacent lagging phase.

The voltages associated with each phase are, respectively, V, $h$V and $h^2$V where $$h = -\frac{1}{2} + j\sqrt{3/2} \quad (4)$$

$$h^2 = -\frac{1}{2} - j\sqrt{3/2} \quad (5)$$

$$h^3 = 1 \quad (6)$$

and $$h + h^2 + h^3 = 0 \quad (7)$$

Also $$\omega_\infty = \frac{2}{\sqrt{3}RC} \quad (8)$$

The main requirement for the symmetrical polyphase network according to the present invention is that each network section must include a first impedance in each of the phases connected between the input and output terminals thereof and the input of each phase must be connected to an adjacent phase, i.e., leading or lagging, via another impedance having a different phase angle characteristic than the first impedance.

Figure 7:
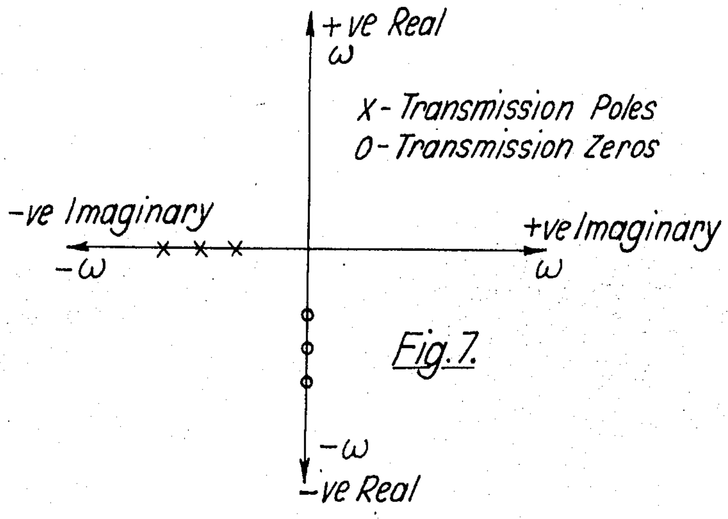
FIG. 7 shows the $\omega$ plane pole-zero plot for a passive symmetrical polyphase network according to the present invention.

The passive symmetrical polyphase networks outlined in the preceding paragraphs are restricted by their passivity to transfer functions with transmission poles on the imaginary axis of their $\omega$ plane pole-zero plot and transmission zeros on the real axis of this plot as shown in FIG. 7.

Figure 8:
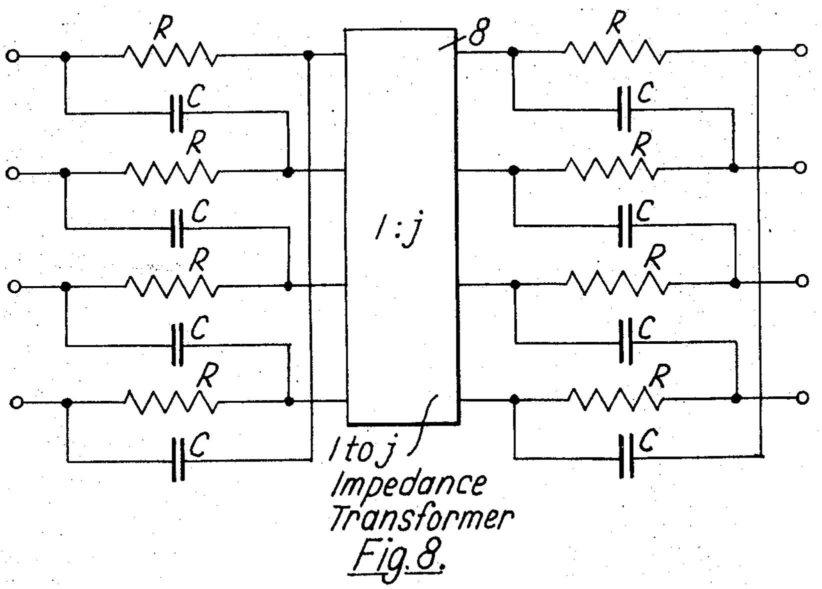
FIG. 8 shows the circuit diagram to two of the symmetrical four phase networks according to FIG. 3 connected in cascade via a four phase 1 to $j$ impedance transformer.

For some types of functions, the transmission poles are not, generally, on the imaginary axis. One method of realizing such functions is to interpose N-phase 1 to $j$ impedance transformers of a type as outlined in the copending patent application, Ser. No. 826,149, filed filed May 20, 1969 (M. J. Gingell—9) at one or more points in the cascade of network sections as shown in FIG. 8, for example, wherein a four-phase 1 to $j$ impedance transformer 8 is interposed between two four-phase network sections of the type shown in FIG. 3.

Further freedom of pole position may be obtained by using negative impedance converters or inverters in addition to the N-phase 1 to $j$ impedance transformers which would be interposed between each phase of a network section and a corresponding phase of an N-phase 1 to $j$ impedance transformer.

The symmetrical polyphase networks outlined in the preceding paragraphs have a particular, but not necessarily an exclusive, application in the N-path frequency translation system outlined in British Pat. No. 1,098,250 and also in single sideband generation in a manner similar, but superior to, conventional quadrature modulation.

The transfer function of the N-path frequency translation system is defined by $$V_0(p)=K\cdot H(p-p_1)\cdot V_1(p-p_1+P_2)$$

where

Figure 9:
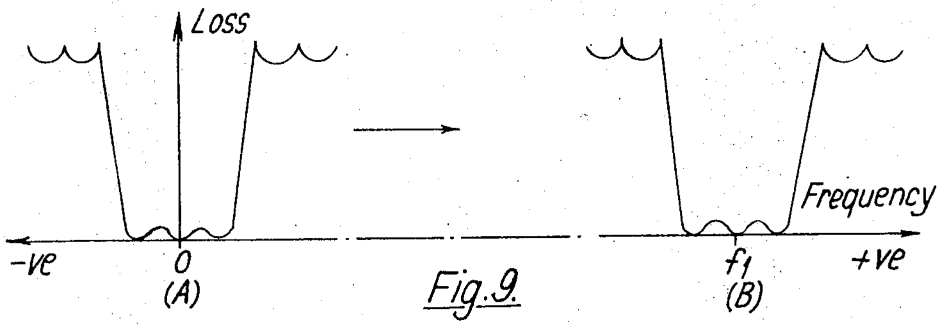
FIGS. 9(A) and (B) show frequency response curves for an N-path frequency translation system having low pass filters connected in each of the N-paths thereof.

K is a constant
H($p$) is the transfer function of the network(s) in the N paths
$P_1=j2\pi f_1$
$P_2=j2\pi f_2$
$f_1$ is the input switching rate
$f_2$ is the output switching rate It can be seen that the transfer function H($p$) is shifted along the real frequency axis by an amount $f_1$. Normally, in the N path filter system where $P_1=P_2$, this would result in a band pass characteristic symmetrical about the frequency $f_1$. If low pass filters are connected in the N paths, the resultant characteristic will be that of a shifted low pass filter (including that at negative frequencies which is the mirror image of the positive frequency remake-up water is preferably aided through valve 29 to sponse). This is shown in FIGS. 9(A) and (B). Symmetrical characteristics are often very wasteful when modulation processes are involved. In such cases, much more attenuation is needed on one side of the pass band than the other. By using the symmetrical polyphase networks according to the present invention, the characteristic can be made to fit the requirement more efficiently. Also, it is no longer necessary for the switching or carrier frequency to be at midband. FIGS. 10(A) and (B) illustrate this by way of example.

The symmetrical polyphase networks according to the present invention may also be used for splitting a single phase into N phases.

Figure 12:
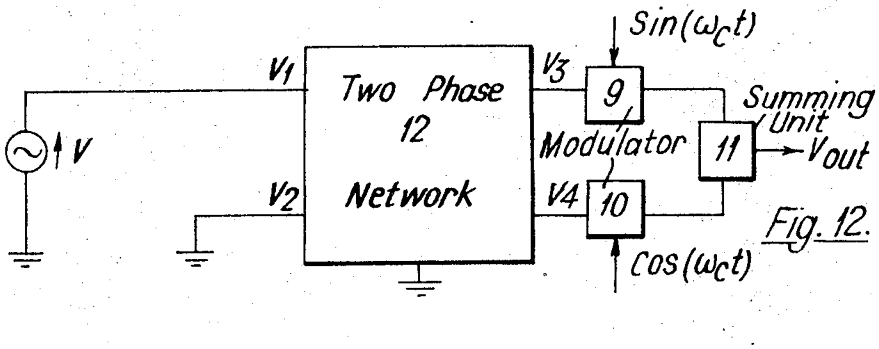
FIG. 12 shows the circuit diagram of a two phase quadrature modulator network.

According to the theory of symmetrical components any unbalanced system of N vectors can be represented as the sum of N symmetrical vector systems. If for example, a two-phase (quadrature) system is considered with an input of V on one phase only then this is equivalent to applying two opposite sequence two-phase signals simultaneously as shown in FIGS. 11(A) to (C). If the transfer function of the system is H($p$) to the vector system according to FIG. 11(B) then it will be H($-p$) to the vector system according to FIG. 11(C). FIG. 12 shows a two-phase system with an input on one phase only which includes a two-phase network 12 having the input $V_1$ for one phase thereof, i.e., phase 1 connected to a voltage source V and the input $V_2$ for the other phase thereof, i.e., phase 2, connected to ground potential, i.e., $V_2=0$. The voltage output $V_3$ of phase 1 is connected via modulator 9 and summing unit 11 to the output and the voltage output $V_4$ of phase 2 is connected via modulator 10 and summing unit 11 to the output.

At the output of phase 1, therefore, $$V_3=\frac{V}{2}(H(p)+H(-p))$$

and on phase 2

$$V_4=\frac{jV}{2}(H(p)-H(-p))$$

If quadrature modulation is then applied to $V_3$ and $V_4$, as shown in FIG. 12, the resultant output is $$V_{o(p)}=V(p\pm p_c)[H(p)+H(-p)\pm j(jH(p)-jH(-p))]=H(p)V(p-p_c)+H(-p)V(p+p_c)$$

The effect is as if the modulation was done first, followed by a normal type of filter with the response $$H(p+p_c)$$

Figure 10:
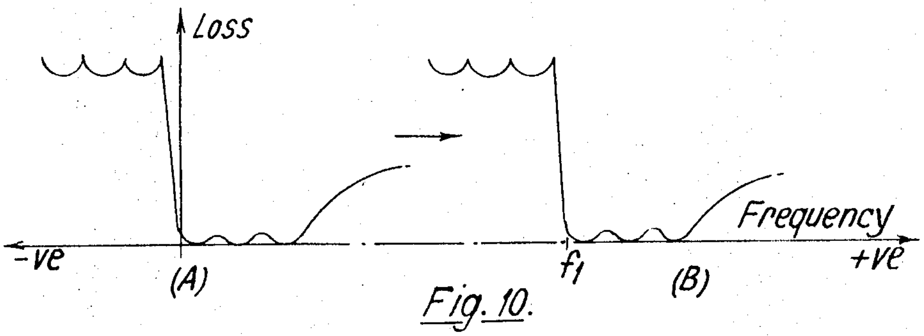
FIGS. 10(A) and (B) show frequency response curves for an N-path frequency translation system which utilizes the symmetrical polyphase networks according to the present invention.

For this purpose, the characteristic of the polyphase network would be as shown in FIG. 10. The lower sideband would then be suppressed while the upper sideband $$V(p+p_c)$$

would be passed. It should be noted that a two-phase version of the network according to the present invention cannot be realized in a practical form, but this basic method can be employed for any number of phases and can, therefore, be adapted for the symmetrical polyphase networks according to the present invention.

It should also be noted that it is possible to use the network of FIG. 12 without modulators and, thus, simply as a circuit to provide a two-phase output from a single-phase input. This is provided the network offers sufficient attenuation to negative sequence inputs and passes positive sequence inputs. FIG. 11 shows a suitable characteristic. In a similar manner, it is possible to generate an N-phase output from a single-phase input.

While I have described above the principles of my invention in connection with specific apparatus, it is to be clearly understood that this description is made only by way of example and not as a limitation to the scope of my invention as set forth in the objects thereof and in the accompanying claims.

I claim:

1. A symmetrical polyphase network comprising at least one polyphase network section including:
N single phase circuits, where N is an integer greater than one;
each of said circuits having
an input terminal,
an output terminal,
a first impedance having a given phase angle characteristic coupled between said input and output terminals of an associated one of said circuits, and
a second impedance having a phase angle characteristic different than said given phase angle characteristic coupled between said input terminal of said associated one of said circuits and the output terminal of another of said circuits responding to the phase of an input signal adjacent the phase of said input signal to which said associated one of said circuits responds.

2. A symmetrical polyphase network according to claim 1, wherein the phase of said input signal to which said another of said circuits responds leads the phase of said input signal to which said associated one of said circuits responds.

3. A symmetrical polyphase network according to claim 1, wherein the phase of said input signal to which said another of said circuits responds lags the phase of said input signal to which said associated one of said circuits responds.

4. A symmetrical polyphase network according to claim 1, wherein said first impedance includes a resistor.

5. A symmetrical polyphase network according to claim 1, wherein said second impedance includes a capacitor.

6. A symmetrical polyphase network according to claim 1, wherein said second impedance includes a capacitor, and a resistor coupled in series with said capacitor.

7. A symmetrical polyphase network according to claim 1, wherein said first impedance includes a resistor; and
said second impedance includes a capacitor.

8. A symmetrical polyphase network according to claim 1, wherein said first impedance includes a first resistor; and
said second impedance includes a capacitor, and a second resistor coupled in series with said capacitor.

9. A symmetrical polyphase network according to claim 1, including at least one additional polyphase network section coupled in cascade with said one polyphase network section.

10. A symmetrical polyphase network according to claim 9, wherein an N single phase 1 to *j* impedance transformer is interposed between adjacent ones of said cascade connected network sections.

11. A symmetrical polyphase network according to claim 1, wherein said first impedance includes a capacitor.

12. A symmetrical polyphase network according to claim 1, wherein said first impedance includes a capacitor, and a resistor coupled in series with said capacitor.

13. A symmetrical polyphase network according to claim 1, wherein said first impedance includes a capacitor; and
said second impedance includes a resistor.

14. A symmetrical polyphase network according to claim 1, wherein said first impedance includes a capacitor, and a first resistor coupled in series with said capacitor; and
said second impedance includes a second resistor.

References Cited

UNITED STATES PATENTS

| | | | |
|---|---|---|---|
| 2,546,021 | 3/1951 | Sonnemann | 317—47X |
| 3,265,958 | 8/1966 | Seulen | 323—124X |
| 3,334,273 | 8/1967 | Howland | 317—48 |

J D MILLER, Primary Examiner

G. GOLDBERG, Assistant Examiner

U.S. Cl. X.R.

307—127; 317—47, 48